United States Patent Office 3,539,630
Patented Nov. 10, 1970

3,539,630
ACETYLATED(1-ADAMANTYLOXY) ALKYL-
AMINE COMPOUNDS
Stephen Slomo Szinai, Wokingham, and Jiban Kumar
Chakrabarti, Frimley, England, assignors to Eli Lilly
and Company, Indianapolis, Ind., a corporation of
Indiana
No Drawing. Filed July 11, 1968, Ser. No. 743,941
Claims priority, application Great Britain, July 18, 1967,
32,914/67
Int. Cl. C07c 103/38
U.S. Cl. 260—561                                                  4 Claims

ABSTRACT OF THE DISCLOSURE

Acetylated (1-adamantyloxy)alkylamine compounds useful as depressants for the central nervous system.

BACKGROUND OF THE INVENTION

South African Pat. 65/4,102, issued to Geigy, A. G., discloses certain adamantylguanidine compounds of the formula

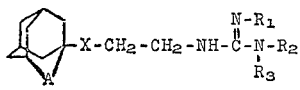

wherein A represents methylene or ethylene; X represents oxygen, sulfur, imino, or lower alkylimino; and $R_1$, $R_2$, and $R_3$ represent a hydrogen atom or at most two of these three symbols represent lower alkyl radicals. These adamantylguanidine compounds have sympathicolytic activities which are therapeutically useful for the treatment of hypertension; they also have antiviral activity.

The synthesis of these adamantylguanidine compounds, as taught by the South African patent, is by reaction of the corresponding amine:

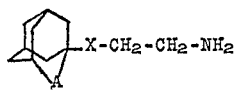

with a reactant of the formula:

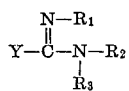

wherein Y represents a radical which can be split off. The amine compound, in turn, is synthesized, in accordance with the teaching of the South African patent, by a three step reaction which is illustrated, where A is methylene and X is oxygen, by the following reaction sequence, in which "Ad" is used as an abbreviation for 1-adamantyl:

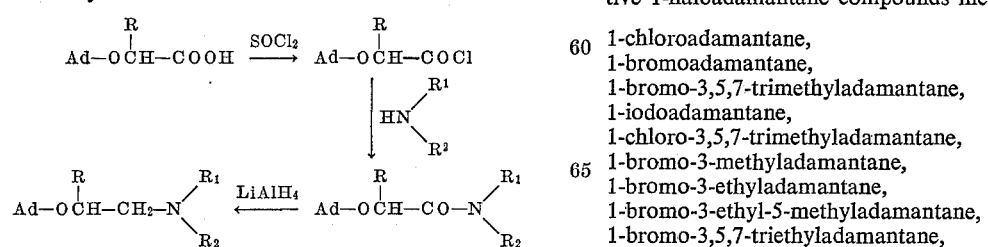

Other synthesis routes, even more complex, are proposed for these compounds as well as for those amine starting materials wherein X is imino or alkylimino.

SUMMARY OF THE INVENTION

There has now been discovered a novel one-step process for the preparation of many of the adamantylamines useful as starting materials to synthesize the adamantylguanidine products of the South African patent above discussed. This process comprises the reaction, in the presence of an organic tertiary amine, of a 1-haloadamantane compound with an alkanolamine, yielding the corresponding (1-adamantyloxy)alkylamine directly. Certain of these (1-adamantyloxy)alkylamine compounds can be acetylated in standard procedures, yielding the corresponding N-acetyl derivatives. The products of the initial process, as well as the acetylated derivatives thereof, are useful as central nervous system depressants.

DETAILED DESCRIPTION OF THE INVENTION

The present invention is directed to a process for the preparation of compounds of the formula

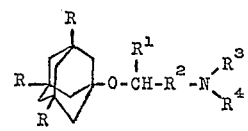

This process comprises reacting, in the presence of an organic tertiary amine, a 1-halodamantane compound of the formula

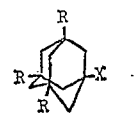

wherein each R represents hydrogen or loweralkyl, the sum of the number of carbon atoms in all three R groups being not greater than 6; and X represents bromo, chloro, or iodo, with an alkanolamine of the formula

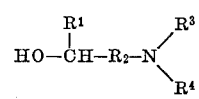

wherein $R^1$ represents hydrogen, methyl, or ethyl; $R^2$ represents alkylene of from 1 to 5, both inclusive, carbon atoms; and each of $R^3$ and $R^4$, taken separately, independently represents hydrogen or loweralkyl of from 1 to 4, both inclusive, carbon atoms, or $R^3$ and $R^4$ taken jointly with the nitrogen atom to which they are attached constitute pyrrolidine, piperidine, or morpholine. In this definition, hereinabove as throughout the present application, "alkylene" is inclusive of both straight-chain alkylene as well as branched alkylene, and the term "halo" is employed to designate bromo, chloro, and iodo, only.

In accordance with the present invention, representative 1-haloadamantane compounds include:

1-chloroadamantane,
1-bromoadamantane,
1-bromo-3,5,7-trimethyladamantane,
1-iodoadamantane,
1-chloro-3,5,7-trimethyladamantane,
1-bromo-3-methyladamantane,
1-bromo-3-ethyladamantane,
1-bromo-3-ethyl-5-methyladamantane,
1-bromo-3,5,7-triethyladamantane,
1-bromo-3,5-dimethyladamantane,
1-bromo-3-isopropyladamantane,
1-chloro-3,5-dimethyladamantane, and
1-bromo-3,5-di-n-propyladamantane;

and representative alkanolamine reactants include:
2-hydroxyethylamine,
3-hydroxy-n-propylamine,
2-hydroxy-1,1-dimethylethylamine,
2-hydroxy-1,1,N,N-tetramethylethylamine,
1-(2-hydroxyethyl)piperidine,
1-(2-hydroxyethyl)morpholine,
1-(3-hydroxy-n-propyl)pyrrolidine,
2-hydroxy-n-propylamine,
2-hydroxy-N-methylethylamine,
2-hydroxy-N,N-diethylethylamine,
1-(2-hydroxyethyl)pyrrolidine,
4-hydroxy-n-butylamine,
5-hydroxy-n-pentylamine,
2-hydroxy-N,N-di-sec-butylethylamine,
2-hydroxy-N-isopropylethylamine,
5-hydroxy-N,N-dimethyl-n-hexylamine,
4-hydroxy-3-methyl-n-butylamine,
1-(2-hydroxy-n-propyl)morpholine,
2-hydroxy-n-butylamine, and
6-hydroxy-n-hexylamine.

Preferred 1-haloadamantane compounds are those wherein each R is hydrogen or methyl only.

The reaction of the 1-haloadamantane compound and the alkanolamine is carried out in the presence of an organic tertiary amine. The identity of such organic tertiary amine is not critical; liquid trialkylamines, pyridine, and alkyl-substituted pyridines, are suitable. Thus particular tertiary amines which are suitable to be employed in accordance with the present invention include triethylamine, tri-n-propylamine, tri-n-butylamine, pyridine, lutidine, especially 2,6-lutidine, α-collidine, β-collidine, and γ-collidine. For reactions carried out at the preferred reflux temperature, one of the foregoing amines which is higher-boiling is required. Generally, triethylamine is the amine of choice for all reactions.

The reaction can be conducted in an inert liquid as a reaction medium. However, where one of the reactants or the organic tertiary amine is a liquid, an excess of such reactant or amine can be employed as a liquid reaction medium. Typically and preferably, triethylamine is employed as both the tertiary amine and solvent for the reaction. The reaction goes forward under a wide range of temperatures, such as from 60 to 200° C. However, it is preferably conducted at reflux temperatures. The reaction consumes the reactants and tertiary amine in amounts representing equimolecular proportions, but usage of an excess of the alkanolamine reactant is preferred. While the reaction goes forward immediately upon the contacting of the reactants in the presence of the organic tertiary amine, yielding some of the desired product almost at once, higher yields are obtained by permitting the reaction mixture to stand for a period of time in the reaction temperature range.

In carrying out the reaction, the reactants and organic tertiary amine are contacted with one another, with or without the use of an inert liquid reaction medium, and the reaction mixture is heated to the reaction temperature range and maintained for a period of time adequate for the preparation of at least some of the desired product. Thereafter, the desired product is separated from the reaction mixture by conventional procedures, such as pouring into water and extraction into ether. If desired, the product can be purified, also by conventional procedures, such as fractional distillation. Oftentimes, separation and purification are conveniently accomplished by making a salt of the desired product and separating such salt by filtration and subsequent crystallization.

Thus, in the foregoing method are prepared all the (1-adamantyloxy)alkylamine compounds of the formula:

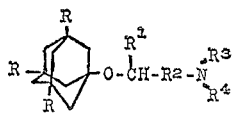

Those (1-adamantyloxy)alkylamine compounds wherein either $R^3$ or $R^4$ represents hydrogen can be acetylated in conventional procedures to obtain the corresponding N-acetyl-(1-adamantyloxy)alkylamine compounds:

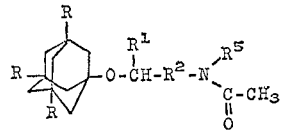

wherein $R^5$ represents the remaining $R^3$ or $R^4$ moiety, i.e., hydrogen or loweralkyl of from 1 to 4, both inclusive, carbon atoms. The acetylation can be carried out in any conventional procedure; but not typically and conveniently, the acetylation is conducted by reacting the (1-adamantyloxy)alkylamine with acetic anhydride in pyridine. The reaction results in the preparation of the desired N-acetyl-(1-adamantyloxy)alkylamine compound, which can be separated by conventional procedures.

The following examples illustrate the present invention and will enable those skilled in the art to practice the same.

Example 1

Preparation of 2-(1-adamantyloxy)-n-propylamine.—1-bromoadamantane (4.3 grams; 0.02 mole) and 2-hydroxy-n-propylamine (15.5 ml., 0.2 mole) were mixed together in triethylamine (5.6 ml.). The resulting reaction mixture was heated to reflux temperature and refluxed for 10 hours. At the end of this period of time, the reaction mixture was poured onto ice-cold water and extracted with ether. The ether phase was washed several times with water and then with dilute hydrochloric acid. The acid extract was washed with ether and then basified with dilute sodium hydroxide. From the basified solution, the desired 2-(1-adamantyloxy)-n-propylamine product was extracted into ether and the extract washed with water, dried over magnesium sulfate, and evaporated to separate the product as an oil. The product was distilled, B.P., 100–101° C./0.2 mm. The product so obtained had a refractive index of $n_{20}^D$ 1.5103.

Analysis.—Calc. (percent): C, 74.6; N, 6.7; H, 11.1. Found (percent): C, 74.3; N, 6.9; H, 11.1.

Three grams of the product were dissolved in dry ether (100 ml.). The solution was cooled to ice-cold temperature and dry hydrogen chloride gas passed into it. The reaction mixture was then evaporated to dryness under vacuum, yielding 2-(1-adamantyloxy)-n-propylamine hydrochloride product as a solid. After recrystallization from dioxane/ethanol the hydrochloride melted at 187–9° C.

Analysis.—Calc. (percent): C, 63.5; N, 5.7; H, 9.8. Found (percent): C, 63.5; N, 5.9; H, 9.6.

Example 2

Preparation of 3-(1-adamantyloxy)-n-propylamine.—1-bromoadamantane (4.3 grams; 0.02 mole), 3-hydroxy-n-propylamine (15.4 ml.; 0.2 mole), and dry triethylamine (5.6 ml.) were mixed and refluxed for about 10 hours. The reaction mixture was then worked up as described in Example 1, yielding the desired 3-(1-adamantyloxy)-n-propylamine as an oil. The oil was distilled, B.P., 100–102° C./0.2 mm. The refractive index was found to be $n_{20}^D$ 1.5092.

Analysis.—Calc. (percent): C, 74.57; N, 6.69; H, 11.07. Found (percent): C, 74.29; N, 6.72; H, 11.08.

The hydrochloride melted at 155–7° C.

Analysis.—Calc. (percent): C, 63.53; N, 5.70; H, 9.85. Found (percent): C, 63.37; N, 5.61; H, 10.17.

Example 3

Preparation of N-acetyl-2-(1-adamantyloxy)-n-propylamine.—2-(1-adamantyloxy)-n-propylamine (0.5 g.), prepared as described hereinabove in Example 1, was mixed with pyridine (1–2 ml.) and acetic anhydride (5 ml.) and kept at room temperature for 72 hours. The mixture was then poured onto ice water, and the organic phase extracted into ether, washed with 5 percent aqueous bicarbonate solution and water, and dried with magnesium sulfate; removal of solvent and crystallization gave the desired N-acetyl-2-(1-adamantyloxy)-n-propylamine compound, melting at 104–6° C.

Analysis.—Calc. (percent): C, 71.7; N, 5.6; H, 10.01. Found (percent): C, 71.9; N, 5.8; H, 9.84.

Examples 4–14

Other products are prepared in accordance with the procedures of Example 1, employing one mole of each of the 1-haloadamantane and triethylamine and a tenfold molar excess of the alkanolamine. The particular starting materials, product, yield, and characterizing property of the product are set forth in the following table.

Examples 23–26

Other N-acetyl derivatives which can be prepared in accordance with the present invention include those identified hereinbelow:

N-acetyl-6-(1-adamantyloxy)-n-hexylamine
N-acetyl-2-(1-adamantyloxy)-N-ethyl-n-butylamine
N-acetyl-2-(1-adamantyloxy)N-n-butylethylamine
N-acetyl-2-(1-adamantyloxy)-N-ispropyl-n-propylamine Those (1-adamantyloxy)alkylamine compounds wherein each of R, $R^1$, $R^3$, and $R^4$ is hydrogen, and $R^2$ is methylene, are useful in the synthesis of the compounds of South African Pat. 65/4,102. However, all of the (1-adamantyloxy)alkylamine compounds as well as their salts and the corresponding N-acetyl compounds, are

| Example | 1-haloadamantane compound | Alkanolamine | Product | Percent yield | Product, B.P., °C. mm. | Hydrochloride, M.P.,°C. |
|---|---|---|---|---|---|---|
| 4 | 1-bromoadamantane | 2-hydroxy-1,1,N,N-tetramethylethylamine | 2-(1-adamantyloxy)-1,1,N,N-tetramethylethylamine | 50 | 120–2/0.3 | [1] 160–3 |
| 5 | do | 2-hydroxyethylamine | 2-(1-adamantyloxy)ethylamine | 90 | 89–90/0.1 | 206–8 |
| 6 | do | 2-hydroxy-N-methylethylamine | 2-(1-adamantyloxy)-N-methylethylamine | 77 | 108–10/0.3 | 158–60 |
| 7 | do | 2-hydroxy-N,N-diethylethylamine | 2-(1-adamantyloxy)-N,N-diethylethylamine | 94 | 108–10/0.2 | 152–3 |
| 8 | 1-bromo-3,5,7-trimethyladamantane | 2-hydroxyethylamine | 2-(3,5,7-trimethyl-1-adamantyloxy)-ethylamine | 7 89 | [2] 94–95 | 178–80 |
| 9 | 1-bromoadamantane | 1-(2-hydroxyethyl)-pyrrolidine | 1-(2-(1-adamantyloxy)-ethyl)pyrrolidine | 87 |  | 195–8 |
| 10 | do | 1-(2-hydroxyethyl)-piperidine | 1-(2-(1-adamantyloxy)-ethyl)piperidine | 91 | 132–4/0.1 | 246 |
| 11 | do | 1-(2-hydroxyethyl)-morpholine | 1-(2-(1-adamantyloxy)-ethyl)morpholine | 90 |  | 225–7 |
| 12 | do | 4-hydroxy-n-butylamine | 4-(1-adamantyloxy)-n-butylamine | 80 | 120/1.0 | 142–4 |
| 13 | 1-bromo-3,5,7-trimethyladamantane | 4-hydroxy-n-butylamine | 4-(3,5,7-trimethyl-1-adamantyloxy)-n-butylamine | 90 | [2] 74–76 | 281–3 |
| 14 | 1-bromoadamantane | 5-hydroxy-n-pentylamine | 5-(1-adamantyloxy)-n-pentylamine | 72 | 158–60/5 | 179–81 |

[1] Decanoate.
[2] Melting Point.

Examples 15–19

In other representative operations in accordance with the present invention, other 1-haloadamantane compounds are reacted with other alkanolamines to give the corresponding products in good yield. The reactants, organic tertiary amine, and product are set forth in the following table:

| Example | 1-Haloadamantane compound | Alkanolamine | Organic tertiary amine | Product |
|---|---|---|---|---|
| 15 | 1-chloroadamantane | 2-hydroxy-n-butylamine | tri-n-butylamine | 2-(1-adamantyloxy)-n-butylamine. |
| 16 | 1-bromo-3-methyladamantane | 2-hydroxyethylamine | pyridine | 2-(3-methyl-1-adamantyloxy)-ethylamine. |
| 17 | 1-chloroadamantane | 2-hydroxy-N,N-di-secbutylethylamine | triethylamine | 2-(1-adamantyloxy)-N,N-sec-butylethylamine. |
| 18 | 1-chloro-3,5-dimethyladamantane | 3-hydroxy-n-propylamine | α-collidine | 3-(3,5-dimethyl-1-adamantyloxy)-n-propylamine. |
| 19 | 1-bromo-3-isopropyladamantane | 6-hydroxy-n-hexylamine | 2,6-lutidine | 5-(3-isopropyl-1-adamantyloxy)-n-hexylamine. |

Examples 20–22

In yet other operations, representative compounds prepared in accordance with the process of the present invention were thereafter acetylated in accordance with the procedures of Example 3. The compounds thus obtained, and their identifying characteristics, are listed in the following table.

| Name of compound | Identifying characteristic |
|---|---|
| N-acetyl-2-(1-adamantyloxy)ethylamine | –8° C.[1] |
| N-acetyl-2-(1-adamantyloxy)-N-methylethylamine | 150° C./0.4 mm.[2] |
| N-acetyl-2-(3,5,7-trimethyl-1-adamantyloxy)-ethylamine | 93–5° C.[1] |

[1] Melting Point.
[2] Boiling Point.

useful as depressants for the central nervous system. Thus, the compounds can be used in controlling hyper-excitability in animals. The compounds can be administered in any of several methods, but generally the oral method is preferable. The compounds can be used in mice at dosages of up to 200 mg./kg. when administered orally, and at dosages of up to 400 mg./kg. administered intraperitoneally. Higher dosages can cause undesirable side effects including toxic effects, and are therefore to be avoided. Lesser amounts, of course, can be used and are often preferred in order to achieve highly specific response.

The compounds cause desirable muscle relaxation, and can therefore be employed as muscle relaxants. In representative procedures, groups of mice, two mice per group, were employed in the evaluation of various compounds of the present invention. Each group was administered one of the candidate compounds and all groups were thereafter observed in accordance with standardized test procedures for the changed response of the mice in tests for grasping loss, abdominal tone loss, foreleg weakness, and hindleg weakness, indicators of muscle relaxation. In these tests, each of the compounds listed below showed muscle relaxation, at the dosage set forth and in the mode of administration identified. In this following table, "i.p." is employed as an abbreviation for the term intraperitoneal.

| Name of compound | Mode of administration | Dosage (in mg./kg.) |
|---|---|---|
| 1-(2-(1-adamantyloxy)ethyl)-pyrrolidine hydrochloride. | Oral | 100 |
| 1-(2-(1-adamantyloxy)ethyl)-morpholine hydrochloride. | i.p | 100 |
| 4-(1-adamantyloxy)-n-butyl-amine hydrochloride. | i.p | 50 |
| N-acetyl-2-(3,5,7-trimethyl-1-adamantyloxy) ethylamine. | i.p | 400 |
| 5-(1-adamantyloxy)-n-pentyl-amine hydrochlroide. | i.p | 100 |

We claim:
1. A compound of the formula:

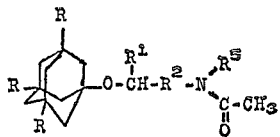

wherein each R represents hydrogen or loweralkyl, the sum of the number of carbon atoms in all three R groups being not greater than 6; $R^1$ represents hydrogen, methyl, or ethyl; $R^2$ represents alkylene of from 1 to 5 both inclusive, carbon atoms; and $R^5$ represents hydrogen or loweralkyl or from 1 to 4, both inclusive, carbon atoms.

2. The compound of claim 1 which is N-acetyl-2-(1-adamantyloxy)ethylamine.

3. The compound of claim 1 which is N-acetyl-2-(1-adamantyloxy)-n-propylamine.

4. The compound of claim 1 which is N-acetyl-2-(3,5,7-trimethyl-1-adamantyloxy)ethylamine.

References Cited

UNITED STATES PATENTS 3,270,036   8/1966   Bernstein et al. ____ 260—343.7

ALEX MAZEL, Primary Examiner

R. V. RUSH, Assistant Examiner

U.S. Cl. X.R.

260—247.7, 294.7, 326.5, 563, 999